(12) United States Patent
Grabham et al.

(10) Patent No.: US 11,914,569 B2
(45) Date of Patent: Feb. 27, 2024

(54) LIGHT WEIGHT REDUNDANCY TOOL FOR PERFORMING TRANSACTIONS

(71) Applicant: Palantir Technologies Inc., Denver, CO (US)

(72) Inventors: Benjamin Grabham, London (GB); Henry Biddle, London (GB); Jeremy Kong, London (GB); Joseph Lea, London (GB); Mark Elliot, New York, NY (US); Allen Chang, Sunnyvale, CA (US); John Carrino, Menlo Park, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/746,644

(22) Filed: May 17, 2022

(65) Prior Publication Data

US 2022/0276990 A1    Sep. 1, 2022

Related U.S. Application Data

(63) Continuation of application No. 15/795,930, filed on Oct. 27, 2017, now Pat. No. 11,334,552.
(Continued)

(51) Int. Cl.
*G06F 16/23*    (2019.01)
*G06F 9/46*    (2006.01)
*G06F 16/176*    (2019.01)

(52) U.S. Cl.
CPC .......... *G06F 16/2308* (2019.01); *G06F 9/466* (2013.01); *G06F 16/1774* (2019.01);
(Continued)

(58) Field of Classification Search
CPC ............. G06F 16/2308; G06F 16/2379; G06F 16/2343; G06F 16/1774; G06F 16/2322;
(Continued)

(56) References Cited

U.S. PATENT DOCUMENTS

| | | | |
|---|---|---|---|
| 5,724,575 A | 3/1998 | Hoover et al. | |
| 5,872,973 A | 2/1999 | Mitchell et al. | |

(Continued)

FOREIGN PATENT DOCUMENTS

| | | | |
|---|---|---|---|
| AU | 2014206155 A1 | 8/2014 | |
| EP | 0652513 A1 | 5/1995 | |

(Continued)

OTHER PUBLICATIONS

Anonymous, "BackTult—JD Edwards One World Version Control System", in 1 page, Jul. 23, 2007.
(Continued)

*Primary Examiner* — Kris E Mackes
*Assistant Examiner* — Lin Lin M Htay
(74) *Attorney, Agent, or Firm* — Sheppard Mullin Richter & Hampton LLP

(57) ABSTRACT

Systems, methods, and non-transitory computer readable media are provided for providing a redundancy tool for performing transactions. A transaction to be performed on a data stored in a database may be received. A timestamp may be assigned to the transaction. A lock may be assigned on the timestamp. The transaction may be performed on the data. The lock may be refreshed while performing the transaction on the data. A validity of the lock may be checked at after performing the transaction on the data. Responsive to the lock being valid, a result of performing the transaction on the data may be committed.

18 Claims, 5 Drawing Sheets

Related U.S. Application Data

(60) Provisional application No. 62/539,369, filed on Jul. 31, 2017.

(52) U.S. Cl.
CPC ...... *G06F 16/2315* (2019.01); *G06F 16/2322* (2019.01); *G06F 16/2329* (2019.01); *G06F 16/2336* (2019.01); *G06F 16/2343* (2019.01); *G06F 16/2379* (2019.01)

(58) Field of Classification Search
CPC ... G06F 9/466; G06F 16/2315; G06F 16/2336
See application file for complete search history.

(56) References Cited

U.S. PATENT DOCUMENTS

| | | | |
|---|---|---|---|
| 5,897,636 | A | 4/1999 | Kaeser |
| 6,073,129 | A | 6/2000 | Levine et al. |
| 6,094,653 | A | 7/2000 | Li et al. |
| 6,161,098 | A | 12/2000 | Wallman |
| 6,243,717 | B1 | 6/2001 | Gordon et al. |
| 6,304,873 | B1 | 10/2001 | Klein et al. |
| 6,366,933 | B1 | 4/2002 | Ball et al. |
| 6,418,438 | B1 | 7/2002 | Campbell |
| 6,477,527 | B2 | 11/2002 | Carey et al. |
| 6,510,504 | B2 | 1/2003 | Satyanarayana |
| 6,549,752 | B2 | 4/2003 | Tsukamoto |
| 6,560,620 | B1 | 5/2003 | Ching |
| 6,574,635 | B2 | 6/2003 | Stauber et al. |
| 6,745,382 | B1 | 6/2004 | Zothner |
| 6,976,210 | B1 | 12/2005 | Silva et al. |
| 6,980,984 | B1 | 12/2005 | Huffman et al. |
| 7,058,648 | B1 | 6/2006 | Lightfoot et al. |
| 7,111,231 | B1 | 9/2006 | Huck et al. |
| 7,194,680 | B1 | 3/2007 | Roy et al. |
| 7,461,158 | B2 | 12/2008 | Rider et al. |
| 7,725,530 | B2 | 5/2010 | Sah et al. |
| 7,725,728 | B2 | 5/2010 | Ama et al. |
| 7,730,082 | B2 | 6/2010 | Sah et al. |
| 7,730,109 | B2 | 6/2010 | Rohrs et al. |
| 7,761,407 | B1 | 7/2010 | Stern |
| 7,814,084 | B2 | 10/2010 | Hallett et al. |
| 7,962,495 | B2 | 6/2011 | Jain et al. |
| 7,984,374 | B2 | 7/2011 | Caro et al. |
| 8,041,714 | B2 | 10/2011 | Aymeloglu et al. |
| 8,112,425 | B2 | 2/2012 | Baum et al. |
| 8,126,848 | B2 | 2/2012 | Wagner |
| 8,185,819 | B2 | 5/2012 | Sah et al. |
| 8,229,902 | B2 | 7/2012 | Vishniac et al. |
| 8,504,542 | B2 | 8/2013 | Chang et al. |
| 8,676,857 | B1 | 3/2014 | Adams et al. |
| 8,930,331 | B2 | 1/2015 | McGrew et al. |
| 8,954,410 | B2 | 2/2015 | Chang et al. |
| 9,009,827 | B1 | 4/2015 | Albertson et al. |
| 9,043,696 | B1 | 5/2015 | Meiklejohn et al. |
| 9,092,482 | B2 | 7/2015 | Harris et al. |
| 9,116,975 | B2 | 8/2015 | Shankar et al. |
| 9,171,019 | B1 | 10/2015 | Donlan |
| 9,208,159 | B2 | 12/2015 | Stowe et al. |
| 9,230,280 | B1 | 1/2016 | Maag et al. |
| 9,280,532 | B2 | 3/2016 | Cicerone |
| 10,367,676 | B1* | 7/2019 | Vermeulen ............... H04L 41/30 |
| 10,489,213 | B2 | 11/2019 | Vaskova |
| 10,630,566 | B1* | 4/2020 | Nguyen ............... H04L 41/0893 |
| 11,334,552 | B2 | 5/2022 | Grabham et al. |
| 2001/0056522 | A1 | 12/2001 | Satyanarayana |
| 2002/0091694 | A1 | 7/2002 | Hrle et al. |
| 2003/0105759 | A1 | 6/2003 | Bess et al. |
| 2003/0115481 | A1 | 6/2003 | Baird et al. |
| 2003/0120675 | A1 | 6/2003 | Stauber et al. |
| 2003/0130993 | A1 | 7/2003 | Mendelevitch et al. |
| 2003/0212718 | A1 | 11/2003 | Tester |
| 2004/0111410 | A1 | 6/2004 | Burgoon et al. |
| 2004/0117345 | A1 | 6/2004 | Bamford et al. |
| 2004/0117387 | A1 | 6/2004 | Civetta et al. |
| 2004/0148301 | A1 | 7/2004 | McKay et al. |
| 2005/0097441 | A1 | 5/2005 | Herbach et al. |
| 2005/0108231 | A1 | 5/2005 | Findleton et al. |
| 2005/0114763 | A1 | 5/2005 | Nonomura et al. |
| 2005/0289524 | A1 | 12/2005 | McGinnes |
| 2006/0074881 | A1 | 4/2006 | Vembu et al. |
| 2006/0080316 | A1 | 4/2006 | Gilmore et al. |
| 2006/0095521 | A1 | 5/2006 | Patinkin |
| 2006/0106847 | A1 | 5/2006 | Eckardt et al. |
| 2006/0116991 | A1 | 6/2006 | Calderwood |
| 2006/0161558 | A1 | 7/2006 | Tamma et al. |
| 2006/0218206 | A1 | 9/2006 | Bourbonnais et al. |
| 2006/0218405 | A1 | 9/2006 | Ama et al. |
| 2006/0218491 | A1 | 9/2006 | Grossman et al. |
| 2006/0242630 | A1 | 10/2006 | Koike et al. |
| 2006/0253502 | A1 | 11/2006 | Raman et al. |
| 2006/0265397 | A1 | 11/2006 | Bryan et al. |
| 2007/0050429 | A1 | 3/2007 | Goldring et al. |
| 2007/0061487 | A1 | 3/2007 | Moore et al. |
| 2007/0143253 | A1 | 6/2007 | Kostamaa et al. |
| 2007/0185850 | A1 | 8/2007 | Walters et al. |
| 2007/0233756 | A1 | 10/2007 | D'Souza et al. |
| 2007/0271317 | A1 | 11/2007 | Carmel |
| 2008/0015970 | A1 | 1/2008 | Brookfield et al. |
| 2008/0071853 | A1* | 3/2008 | Mosier ............... H04L 67/1095 709/201 |
| 2008/0104060 | A1 | 5/2008 | Abhyankar et al. |
| 2008/0104149 | A1 | 5/2008 | Vishniac et al. |
| 2008/0195672 | A1 | 8/2008 | Hamel et al. |
| 2008/0201339 | A1 | 8/2008 | McGrew |
| 2008/0215546 | A1 | 9/2008 | Baum et al. |
| 2008/0270316 | A1 | 10/2008 | Guidotti et al. |
| 2008/0301378 | A1 | 12/2008 | Carrie |
| 2009/0031247 | A1 | 1/2009 | Walter et al. |
| 2009/0037417 | A1 | 2/2009 | Shankar et al. |
| 2009/0106308 | A1 | 4/2009 | Killian et al. |
| 2009/0164387 | A1 | 6/2009 | Armstrong et al. |
| 2009/0172669 | A1 | 7/2009 | Bobak et al. |
| 2009/0177962 | A1 | 7/2009 | Gusmorino et al. |
| 2009/0240664 | A1 | 9/2009 | Dinker et al. |
| 2009/0254971 | A1 | 10/2009 | Herz |
| 2009/0271435 | A1 | 10/2009 | Yako et al. |
| 2009/0276431 | A1 | 11/2009 | Lind |
| 2009/0313223 | A1 | 12/2009 | Rantanen |
| 2009/0313311 | A1 | 12/2009 | Hoffmann et al. |
| 2010/0036831 | A1 | 2/2010 | Vemuri et al. |
| 2010/0070489 | A1 | 3/2010 | Aymeloglu et al. |
| 2010/0076939 | A1 | 3/2010 | Iwaki et al. |
| 2010/0082541 | A1 | 4/2010 | Kottomtharayil |
| 2010/0114817 | A1 | 5/2010 | Broeder et al. |
| 2010/0114831 | A1 | 5/2010 | Gilbert et al. |
| 2010/0114887 | A1 | 5/2010 | Conway et al. |
| 2010/0138842 | A1 | 6/2010 | Balko et al. |
| 2010/0145909 | A1 | 6/2010 | Ngo |
| 2010/0161565 | A1 | 6/2010 | Lee et al. |
| 2010/0161688 | A1 | 6/2010 | Kesselman et al. |
| 2010/0191884 | A1 | 7/2010 | Holsenstein et al. |
| 2010/0211550 | A1 | 8/2010 | Daniello et al. |
| 2010/0211618 | A1 | 8/2010 | Anderson et al. |
| 2010/0235606 | A1 | 9/2010 | Oreland et al. |
| 2010/0283787 | A1 | 11/2010 | Hamedi et al. |
| 2010/0318838 | A1 | 12/2010 | Katano et al. |
| 2010/0325581 | A1 | 12/2010 | Finkelstein et al. |
| 2011/0029498 | A1 | 2/2011 | Ferguson et al. |
| 2011/0047540 | A1 | 2/2011 | Williams et al. |
| 2011/0153592 | A1 | 6/2011 | DeMarcken |
| 2011/0161132 | A1 | 6/2011 | Goel et al. |
| 2011/0173619 | A1 | 7/2011 | Fish |
| 2011/0184813 | A1 | 7/2011 | Barne et al. |
| 2011/0258158 | A1 | 10/2011 | Resende, Jr. et al. |
| 2011/0258242 | A1 | 10/2011 | Eidson et al. |
| 2011/0270812 | A1 | 11/2011 | Ruby |
| 2012/0072825 | A1 | 3/2012 | Sherkin et al. |
| 2012/0123989 | A1 | 5/2012 | Yu et al. |
| 2012/0124179 | A1 | 5/2012 | Cappio et al. |
| 2012/0136804 | A1 | 5/2012 | Lucia |
| 2012/0150791 | A1 | 6/2012 | Willson |
| 2012/0159307 | A1 | 6/2012 | Chung et al. |

(56) References Cited

U.S. PATENT DOCUMENTS

| | | |
|---|---|---|
| 2012/0324069 A1 | 12/2012 | Nori |
| 2012/0330908 A1 | 12/2012 | Stowe et al. |
| 2013/0036346 A1 | 2/2013 | Cicerone |
| 2013/0060742 A1 | 3/2013 | Chang et al. |
| 2013/0097130 A1 | 4/2013 | Bingol et al. |
| 2013/0151388 A1 | 6/2013 | Falkenborg et al. |
| 2013/0304770 A1 | 11/2013 | Boero et al. |
| 2013/0318060 A1 | 11/2013 | Chang et al. |
| 2014/0149272 A1 | 5/2014 | Hirani et al. |
| 2014/0181833 A1 | 6/2014 | Bird et al. |
| 2014/0324876 A1 | 10/2014 | Konik et al. |
| 2014/0344231 A1 | 11/2014 | Stowe et al. |
| 2015/0039886 A1 | 2/2015 | Kahol et al. |
| 2015/0089353 A1 | 3/2015 | Folkening |
| 2015/0106347 A1 | 4/2015 | McGrew et al. |
| 2015/0112956 A1 | 4/2015 | Chang et al. |
| 2015/0193264 A1 | 7/2015 | Hutton |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0242397 A1 | 8/2015 | Zhuang |
| 2015/0261817 A1 | 9/2015 | Harris et al. |
| 2015/0277969 A1 | 10/2015 | Strauss |
| 2015/0341467 A1 | 11/2015 | Lim et al. |
| 2016/0034545 A1 | 2/2016 | Shankar et al. |
| 2016/0050118 A1* | 2/2016 | Blanco ............... H04W 4/08 370/254 |
| 2016/0062555 A1 | 3/2016 | Ward et al. |
| 2016/0147730 A1 | 5/2016 | Cicerone |
| 2016/0147861 A1 | 5/2016 | Schreter |

FOREIGN PATENT DOCUMENTS

| | | |
|---|---|---|
| EP | 2555126 A2 | 2/2013 |
| EP | 2863326 A1 | 4/2015 |
| EP | 2891992 A1 | 7/2015 |
| EP | 2993595 A1 | 3/2016 |
| WO | 2012025915 A1 | 3/2012 |

OTHER PUBLICATIONS

Antoshenkov, Gennady, "Dictionary-Based Order-Preserving String Compression", The VLDB Journal, pp. 26-39, 1997.

Apache HBase.

Baker et al., "Megastore: Providing Scalable, Highly Available Storage for Interactive Services", 5th Biennial Conference on Innovative Data Systems Research (CIDR '11), Asilomar, California, Jan. 9-12, 2011.

Bernstein et al., "Hyder—A Transactional Record Manager for Shared Flash", 5th Biennial Conference on Innovative Data Systems Research (CIDR '11), vol. 12, Asilomar, California, Jan. 9-12, 2011.

Chang et al., "Bigtable: A Distributed Storage System for Structured Data", Google, Inc., OSDI'06: Seventh Symposium on Operating System Design and Implementation, Seattle, WA, Nov. 2006.

Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.

Devanbu et al., "Authentic Third-party Data Publication", http://www.cs.ucdavis.edu/.about.devanbu/authdbpub.pdf, p. 19, 2000.

Dreyer et al., "An Object-Oriented Data Model for a Time Series Management System", Proceedings of the 7th International Working Conference on Scientific and Statistical Database Management, p. 12, Charlottesville, Virginia, USA, Sep. 28-30, 1994.

Elmasri et al., "Fundamentals of Database Systems", Fourth Edition, pp. 455-491, 2004.

Hogue et al., "Thresher: Automating the Unwrapping of Semantic Content from the World Wide Web", 14th International Conference on World Wide Web, WWW 2005: Chiba, Japan, May 10-14, 2005.

Klemmer et al., "Where Do Web Sites Come From? Capturing and Interacting with Design History," Association for Computing Machinery, CHI 2002, Apr. 20-25, 2002, Minneapolis, MN, pp. 8.

Kokossi et al., "D7-Dynamic Ontology Management System (Design)", Information Societies Technology Programme, pp. 1-27.

Mentzas et al., "An Architecture for Intelligent Assistance in the Forecasting Process", Proceedings of the Twenty-Eighth Hawaii International Conference on System Sciences, vol. 3, pp. 167-176, Jan. 3-6, 1995.

Miklau et al., "Securing History: Privacy and Accountability in Database Systems", 3rd Biennial Conference on Innovative Data Systems Research (CIDR), pp. 387-396, Asilomar, California, Jan. 7-10, 2007.

Niepert et al., "A Dynamic Ontology for a Dynamic Reference Work", Joint Conference on Digital Libraries, pp. 1-10, Vancouver, British Columbia, Jun. 17-22, 2007.

Nierman, "Evaluating Structural Similarity in XML Documents", 6 pages, 2002.

Peng et al., "Large-scale Incremental Processing Using Distributed Transactions and Notifications", Proceedings of the 9th USENIX Symposium on Operating Systems Design and Implementation, USENIX, p. 14, 2010.

Quest, "Toad for ORACLE 11.6-Guide to Using Toad", pp. 1-162, Sep. 24, 2012.

The Apache Cassandra Project.

Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.

Wikipedia, "Federated Database System," Sep. 7, 2013, retrieved from the internet on Jan. 27, 2015 http://en.wikipedia.org/w/index.php?title=Federated_database_system&oldid-=571954221.

Wollrath et al., "A Distributed Object Model for the Java System", Conference on Object—Oriented Technologies and Systems, pp. 219-231, Jun. 17-21, 1996.

Yang et al., "HTML Page Analysis Based on Visual Cues", A129, pp. 859-864, 2001.

Communication pursuant to Article 94(3) for EP Application No. 18183731.1 dated Feb. 26, 2021, 7 pages.

Palantir. "DocsTransactions Transaction Protocol", Jun. 27, 2016, Retrieved from the Internet: URL:https://web.archive.org/web/20160527085130/http://palantir.github.io:-80/atlasdb/html/transactions/transaction_protocol.html, retrieved on Dec. 17, 201.

Palantir. "TransactionsPerformance Ideas Short-Lived Writes Advisory Locking Prevents Write/Write Conflicts", May 28, 2016, Retrieved from the Internet: URL:https://web.archive.org/web/20160528141015/http://palantir.-github.io:80/atlasdb/html/transactions/performance_ideas.html, retrieved on Dec. 17, 2018.

Palantir. "Transactions Isolation Levels Isolation Levels Snapshot vs Serializable vs No. Conflict Serializable Transactions Theory", May 28, 2016, Retrieved from the internet:URL:https://web.archive.org/web/20160528205259/ http://palantir.github.io:-80/atlasdb/html/transactions/isolation_levels.html, retrieved on Dec. 17, 2018.

Wikipedia: "Paxos (computer science)", May 14, 2016, Retrieved from the Internet: URL:https://web.archive.org/20160514001001/ http://en.wikipedia.-org/wiki/Paxos_(computer_science), retrieved on Dec. 17, 2018.

\* cited by examiner

LIGHT WEIGHT REDUNDANCY TOOL FOR PERFORMING TRANSACTIONS

CROSS REFERENCE TO RELATED APPLICATIONS

This application is a continuation of U.S. patent application Ser. No. 15/795,930, filed Oct. 27, 2017, which claims the benefit under 35 U.S.C. § 119(e) of the U.S. Provisional Application Ser. No. 62/539,369, filed Jul. 31, 2017, the content of which is hereby incorporated by reference in its entirety.

FIELD OF THE INVENTION

This disclosure relates to approaches for providing a redundancy tool for performing transactions.

BACKGROUND

Under conventional approaches, assuring validity of information associated with transactions performed/to be performed on data stored in a database may require multiple nodes having a quorum of at least two nodes per transactions. Running multiples nodes having a quorum of at least two nodes per transactions (e.g., three nodes per transaction) on data may require consumption of large amounts of computing resources, which may render such provision of validation expensive and not scalable.

SUMMARY

Various embodiments of the present disclosure may include systems, methods, and non-transitory computer readable media configured to facilitate providing a redundancy tool for performing transactions. A transaction to be performed on a data stored in a database may be received. A timestamp may be assigned to the transaction. A lock may be assigned on the timestamp. The transaction may be performed on the data. The lock may be refreshed while performing the transaction on the data. A validity of the lock may be checked after performing the transaction on the data. Responsive to the lock being valid, a result of performing the transaction on the data may be committed.

In some embodiments, the systems, methods, and non-transitory computer readable media may be configured to perform, responsive to the lock being invalid, removing the result of performing the transaction on the data.

In some embodiments, the lock may be assigned on the timestamp based on three dedicated timelock nodes. In some embodiments, the three dedicated timelock nodes may include a leader timelock node.

In some embodiments, the transaction on the data may be performed based on two service nodes.

In some embodiments, the timestamp may be assigned based on an order in which the transaction is received with respect to other transactions.

In some embodiments, the lock may be stored in random access memory.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
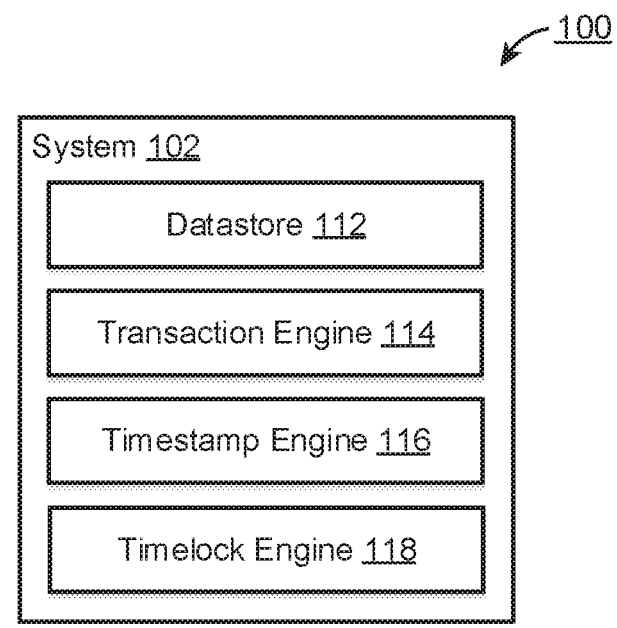
FIG. 1 illustrates an example environment for providing a redundancy tool for performing transactions, in accordance with various embodiments.

A claimed solution rooted in computer technology overcomes problems specifically arising in the realm of computer technology. The approaches disclosed herein may facilitate operation of a transaction layer built on top of a (generic) key value store (e.g., database). Having the transaction layer between client code and underlying key value store may enable online migration from one store to another. The transaction layer may provide indexing of transactions. The transaction layer backed services may be validated via operation of an embedded locking service—that is, individual transaction layer backed services may include a locking service. However, having embedded locking services may be expensive and/or may not be scalable. The approach disclosed herein provides external locking services that reduce the resources needed/consumed for providing validation of database operations backed by a transaction layer—that is, individual locking services are no longer required per individual transaction layer backed service. Moreover, switching from embedded to external locking services may reduce persistence in services and may turn services into stateless services, which may be beneficial for ensuring availability and/or automatic scalability in response to user load.

In various implementations, a system may receive a transaction to be performed on data stored in a database. A timestamp may be assigned to the transaction. A lock may be assigned on the timestamp. The transaction may be performed on the data, and the lock may be refreshed while performing the transaction on the data. A validity of the lock may be checked after performing the transaction on the data. Responsive to the lock being valid, a result of performing the transaction on the data may be committed. Responsive to the lock being invalid, the result of performing the transaction on the data may be removed. In some embodiments, the transaction may be facilitated through a service (e.g., transaction layer backed service).

In some embodiments, the lock may be assigned on the timestamp based on three dedicated timelock nodes. The three timelock nodes may include a leader timelock node. In some embodiments, the transaction on the data may be performed based on two service nodes. In some embodiments, the timestamp may be assigned based on an order in which the transaction is received with respect to other transactions. In some embodiments, the lock may be stored in random access memory. In some embodiments, the number of timelock nodes may be greater than three to provide stronger availability guarantees.

The approach disclosed herein enables provision of a redundancy tool for performing transactions. For example, the approach disclosed herein enables validation of database operations in a highly available and highly scalable manner for transactions on data stored in databases. For example, validity of transactions on database may be provided with high availability by using multiple locking nodes (e.g., servers) having a quorum of at least two nodes per transactions/services (e.g., transaction layer backed services) facilitating the transactions (e.g., three locking nodes per transaction/service). However, such provision of nodes may be expensive (e.g., resource intensive) and not scalable (e.g., ten transactions/services requires thirty nodes; a hundred transactions/services require three-hundred nodes).

The approach disclosed herein reduces the resources needed/consumed for providing validation of database transactions and reduces the required number of nodes by using (external) nodes dedicated to locking services (dedicated timelock nodes). Instead of having three locking nodes running per transactions/services, three dedicated timelock nodes may be used to provide locking services for one or more transactions and two service nodes may run per transactions/services. Thus, the number of nodes required for transactions/services may be reduced (e.g., ten transactions/services require twenty-three nodes; a hundred transactions/services require two-hundred and three nodes). Use of dedicated timelock nodes also provides segregation of codes for validation from other codes, and enables changes to the validation codes (e.g., updates, optimization) without requiring rebuild of other codes.

While the disclosure is described herein with respect to transactions on data in databases, there is merely for illustrative purposes and is not meant to be limiting. The approach disclosed herein may provide a redundancy tool for performing transactions on other types of data/other types of transactions.

FIG. 1 illustrates an example environment 100 for providing a redundancy tool for performing transactions. The example environment 100 may include a computing system 102. The computing system 102 may include one or more processors and memory. The processor(s) may be configured to perform various operations by interpreting machine-readable instructions stored in the memory. The environment 100 may also include one or more datastores (not shown) that is accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include a datastore 112, a transaction engine 114, a timestamp engine 116, and a timelock engine 118. The datastore 112 may include structured and/or unstructured sets of data that can be divided/extracted for provision when needed by one or more components of the environment 100. The datastore 112 may include one or more datasets of information. The datastore 112 may include one or more databases. The datastore 112 may include different data analysis modules that facilitate different data analysis tasks, patches for the applications/systems, custom application/functionalities built for particular application/systems, and/or other information to be used in the environment 100. While the computing system 102 is shown in FIG. 1 as a single entity, this is merely for ease of reference and is not meant to be limiting. One or more components/functionalities of the computing system 100 described herein may be implemented in a single computing device or multiple computing devices.

The transaction engine 114 may be configured to receive one or more transactions to be performed on data stored in one or more databases. For example, the transaction engine 114 may be configured to receive one or more transactions to be performed on data stored in a database of the datastore 112 and/or other locations. A transaction may refer to a request/command to perform/execute one or more processes on data. For example, a transaction may include one or more operations to be performed on data. Operations to be performed on data may include one or more of creating the data, modifying the data, removing the data, using the data to create/modify/remove other data, and/or other operations. Transactions may be received at the system 102 (e.g., via user input through a terminal device) and/or may be transmitted to the system 102 from a remote computing device (e.g., via a network). In some embodiments, the transaction may be facilitated and/or implemented through a service (e.g., transaction layer backed service).

The transaction engine 114 may be configured to perform transactions on the data. A transaction on the data may be performed based on two service nodes. One or both of the service nodes may communicate with one or more dedicated timelock nodes to obtain a timestamp for a transaction and to validate the transaction (e.g., by using a lock associated with the transaction/assigned on the timestamp). Service nodes may perform arbitrary processing operations as part of one or more transactions. Responsive to the transaction being validated (e.g., the lock being valid), the transaction engine 114 may commit the result of performing the transaction on the data. In some embodiments, the result of performing the transaction on the data may be committed to one or more version control tools/commit logs. Responsive to the transaction not being validated (e.g., the lock being invalid), the result of performing the transaction on the data may be removed. Changes (e.g., creation, modification, removal) to the data and/or other data based on the transaction may be reversed to restore the relevant data in the database.

The timestamp engine 116 may be configured to assign a timestamp to a transaction (e.g., to a transaction layer back service facilitating the transaction). A timestamp may refer to logical timestamps that do not have relation to actual time. In some embodiments, timestamps may include vector clocks. In some embodiments, timestamps may be assigned as signed 64-bit integers. Other types/sizes of timestamps are contemplated. Timestamps may be used to process in order transactions on data in a database. Timestamps may be checked to determine which data should be used to perform a given transaction. For example, timestamps may be used to determine which data may be appropriate for a given transaction and which data may be too new/old for the given transaction. A given transaction/given operation(s) of a transaction may be associated with multiple timestamps. For example, a first timestamp may be assigned to the given operation/transaction at the beginning of the operation/ transaction. The data import/export/modification may be performed based on the operation/transaction, and the result of the operation/transaction may be committed at a second timestamp. The first and/or the second timestamp may be used to confirm the data being used/modified in the operation/transaction.

A timestamp may be assigned based on an order in which the transaction is received (e.g., by the transaction engine 114) with respect to other transactions (e.g., received by the transaction engine 114). For non-overlapping timestamp requests, the assigned timestamps may be monotonically increasing. For example, a first timestamp request may start and end before a second timestamp request start. For such timestamp requests, the timestamp assigned to the first timestamp request may be smaller than the timestamp assigned to the second timestamp request. For overlapping timestamp requests, the assigned timestamps may not be monotonically increasing. For example, a first timestamp request may start, and a second timestamp request start before the first timestamp request ends. For such timestamp requests, the timestamp assigned to the first timestamp request may be smaller or larger than the timestamp assigned to the second timestamp request. The assigned timestamps may or may not be consecutive. Furthermore, timestamps are guaranteed to be distinct.

A timestamp may be assigned to a transaction based on communication between one or more of the service nodes and one or more dedicated timelock nodes. For example, two service nodes may run transactions on data/transaction layer backed service. For a given transaction/service, one or both of the service nodes may request timestamps from one or more of three dedicated timelock nodes. Other numbers (even, odd) of dedicated timelock nodes are contemplated. Timestamps may be received individually or as contiguous blocks. For requests for continuous blocks of timestamps, the range returned may include at least one timestamp and at most as many timestamps as the number requested.

Timestamps may be provided by one or more dedicated timelock nodes based on communication/consensus among dedicated timelock nodes. For example, three dedicated timelock nodes may individually run a timestamp service, and the three timestamp services may communicate with each other to come to a consensus on the value of the timestamps. For example, three timelock nodes A, B, and C may individually run a timestamp service. The timelock node A may receive a request for a timestamp from a service node. Based on the reception of the timestamp request, the timelock node A may check with the timelock node B and the timelock node C on the value of the timestamp to be issued before issuing the timestamp. Because of the time/resources required to form a consensus among the timelock nodes (the timestamp services running on the timelock nodes), ranges of timestamps may be confirmed at a time. In some embodiments, the number of timelock nodes may be greater than three to provide stronger availability guarantees.

Having three (or more) timestamp services enables provision of timestamp when one of the timestamp services/timelock nodes is unavailable—that is, only a quorum of timestamp services (e.g., two timestamp services) are required to provide timestamps. One of the benefits of such approach is high availability of timestamps for transactions/services—timestamps may be issued/assigned as long as a majority of the nodes in the cluster are available and can communicate. Use of dedicated timestamp services/timelock nodes enables segregation of codes for timestamp provision from other codes, and enables changes to the timestamp codes (e.g., updates, optimization) without requiring rebuild of other codes.

Having two (or more) service nodes enables requests for timestamps when one of the service nodes is unavailable—that is, only one service node is required to request timestamps. One of the benefits of such approach is high availability of timestamps for transactions/services—timestamps may be requested as long as one of the service node are available and can communicate.

Updating timestamp records per individually issued/assigned timestamps may be resource intensive. Thus, rather than updating the timestamp records per timestamps, the timelock nodes (timestamp service running on the timelock nodes) may reserve multiple timestamps (e.g., a million timestamps) at a time and update the bound of the timestamp record to be the end of the range. When a client requests a timestamp, the timelock nodes (timestamp service running on the timelock nodes) may issue timestamps from its range of timestamps, and may request more when necessary. Thus, only one "persist" action may be necessary for a grouping of timestamp (one per a million timestamps).

In some embodiments, the timestamps may be issued using a leader. One of the timelock nodes (a timestamp service running on one of the timelock nodes) may be assigned to be the leader. The leader may be the only node that actually issues timestamps. The leader may also write an upper bound for the timestamps it has provided to a persistent store (e.g., timestamp table). The upper bound may be written before the timestamps are issued. Writing the upper bound before issuing the timestamp provides a safety mechanism—if a leader fails during an issuing process, the new leader will see the upper bound written by the previous leader. A leader may communicate with a quorum of nodes (timestamp services running on a quorum of nodes) to confirm that it is still the leader. In some embodiments, a leader may be selected based on a distributed consensus algorithm (e.g., Paxos).

The timelock engine 118 may be configured to assign a lock on a timestamp. Assigning a lock on a timestamp may include associating a lock with the individual timestamp. Assigning a lock on a timestamp may include taking out an arbitrary lock and/or locking the timestamp. For example, a standard mode of locking may include taking out arbitrary locks and locking the timestamps may include a special case of locking. A lock on a timestamp may indicate whether transaction/service associated with the timestamp is valid (transaction/service result should be committed) or invalid (transaction/service result should be rolled back). In some embodiments, a lock on a timestamp may include an opportunistic lock. A current/valid lock on a timestamp may indicate that the result of performing a transaction/service on a data is valid.

In some embodiments, the timelock engine 118 may assign a lock on a timestamp (lock a timestamp, timelock) based on an assignment of the timestamp. In some embodiments, the timelock engine 118 may assign a lock on a time stamp after the relevant data has been read and/or written into a memory. In some embodiments, the timelock engine 118 may assign a lock on a timestamp (lock a timestamp) based on a request (e.g., from a client, a service node of the transaction/service) to lock the timestamp. In some embodiments, assigning a lock on a timestamp (e.g., locking the timestamp) may typically be performed on a fresh timestamp. In some embodiments, the timelock engine 118 may assign locks based on one or more underlying transaction protocols.

A lock on a timestamp may enable users to avoid modifying the same data at the same time and avoid data corruption. The timelock engine 118 may, responsive to a lock request, determine whether to assign a lock based on a review of one or more logs (e.g., internal has tables) of granted lock requests. If the data to be locked is present in the log(s), the timelock engine 118 may not lock/assign the timestamp. If the data to be locked is not present in the log(s), the timelock engine 118 may lock/assign the timestamp. In some embodiments, the timelock engine 118 may lock/assign the lock by passing a lock token to the client. In some embodiments, locks may be stored in random access memory for fast access (e.g., for reading, writing, modifying).

A lock on a timestamp may be held for a given duration of time. In some embodiments, the lock may be held for the duration of the transaction/service. In some embodiments, the locks may be held for a portion of the duration of the transaction/service. For the lock to be held/remain valid, a refresh of the lock may be required.

The timelock engine 118 may be configured to refresh the lock while performing the transaction on the data. In some embodiments, the timelock engine 118 may refresh the lock based on user input/system prompt to refresh the lock. In some embodiments, the timelock engine 118 may refresh the lock based on a request (e.g., from a client, a service node of the transaction/service) to refresh the timestamp. In some embodiments, the time engine 118 may refresh the lock based on the associated transaction/service being on-going. In some embodiments, the timelock engine 118 may refresh the lock based on one or more rules (e.g., refreshing the lock based on occurrence/non-occurrence of a given criteria). Other basis for refreshing locks are contemplated. In some embodiments, locks may be refreshed via one or more messages sent to the timelock engine 118. Locks may be refreshed with regular and/or arbitrary frequency. In some embodiments, locks may expire after a certain (e.g., fixed, dynamically determined) amount of time for which the locks have not been refreshed. In some embodiments, this amount of time may be configured by the user and/or the system.

If the lock is not refreshed, the lock may be lost/become invalid. A lock may be not refreshed/lost/become invalid when the associated transaction/service becomes invalid (e.g., the transaction/service is canceled; server running the transaction/service dies/disconnects). A lock may be removed or not refreshed based on user input/system prompt to remove the lock/not refresh the lock. Other basis for removing/not refreshing locks are contemplated.

The timelock engine 118 may be configured to check the validity of a lock after performing the transaction. Responsive to the lock being valid (the transaction being validated), the result of performing the transaction on the data may be committed (e.g., via the transaction engine 114). In some embodiments, the result of performing the transaction on the data may be committed to one or more version control tools/commit logs. Responsive to the lock being invalid (the transaction not being validated), the result of performing the transaction on the data may be removed (e.g., via the transaction engine 114). Changes (e.g., creation, modification, removal) to the data and/or other data based on the transaction may be reversed to restore the relevant data in database.

A lock (timelock) may be assigned on a timestamp based on communication/consensus among timelock nodes. Timelock nodes may (1) provide timestamps, (2) lock timestamps/provide arbitrary locks, and/or (3) keep track of which timestamps have been provided, locked, and/or refreshed. Other operations by the timelock nodes are contemplated.

For example, three dedicated timelock nodes may individually run a timelock service, and the timelock services may communicate with each other to come to a consensus on whether a lock should be assigned, refreshed, and/or removed. For example, referring to the example of timelock nodes A, B, and C, a service nodes may request a lock operation (e.g., assigning, refreshing, removing) to be performed on a time stamp from the timelock node A. Based on the request, the timelock node A may check with the timelock node B and the timelock node C on whether the lock operation should be performed.

Having three (or more) timelock services enables provision of timelock when one of the timetock services/timelock nodes is unavailable—that is, only a quorum of timelock services (e.g., two timelock services) are required to provide timelocks. One of the benefits of such approach is high availability of timelocks for transactions/services—timelocks may be assigned/timestamps may be locked as long as a majority of the nodes in the cluster are available and can communicate. Use of dedicated timelock services/timelock nodes enables segregation of codes for validation of transactions/services from other codes, and enables changes to the validation codes (e.g., updates, optimization) without requiring rebuild of other codes.

Having two (or more) service nodes enables requests for timelock operations when one of the service nodes is unavailable—that is, only one service node is required to request timelock operations. One of the benefits of such approach is high availability of timelocks for operations—timelock operations may be requested as long as one of the service node are available and can communicate.

In some embodiments, the timelocks may be issued/timestamps may be locked using a leader. One of the timelock nodes (a timelock service running on one of the timelock nodes) may be assigned to be the leader. A request for a lock operation may be served by the leader. In some embodiments, a request for a lock operation received by a non-leader timelock node/service may be forwarded to the leader timelock node/service. In some embodiments, a request for a lock operation received by a non-leader timelock node/service may be replied with a message that the respective timelock node/service is not the leader. A leader may communicate with a quorum of nodes (timelock services running on a quorum of nodes) to confirm that it is still the leader. In some embodiments, a leader may be selected based on a distributed consensus algorithm (e.g., Paxos).

In some embodiments, the dedicated timelock nodes may be implemented within a separate processor (timelock processor). Individual timelock processors may contain implementations of multiple (e.g., three) timestamp services and timelock services. Use of a separate timelock processors enables a client obtaining timestamp/lock via communication with a single entity rather than with multiple entities.

Figure 2:
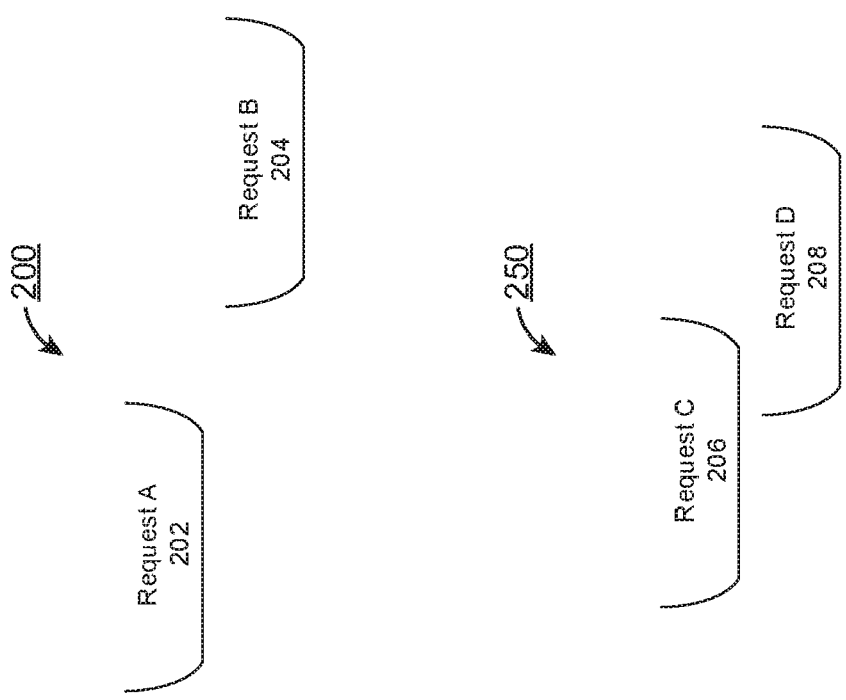
FIG. 2 illustrates example receptions of timestamp request, in accordance with various embodiments.

FIG. 2 illustrates example 200, 250 receptions of timestamp request, in accordance with various embodiments. In the example 200, the request A 202 may start and end before the request B 204 start. For such non-overlapping timestamp requests, the assigned timestamps may be monotonically increasing. For example, the timestamp assigned to the request A 202 may be smaller (e.g., value of 1) than the timestamp assigned to the request B 204 (e.g., value of 2). In the example 250, the request C 206 may start, and the request D 208 may start before the request C 206 ends. For such overlapping timestamp requests, the assigned timestamps may not be monotonically increasing. For example, the timestamp assigned to the request C 206 may be smaller (e.g., value of 1) than the timestamp assigned to the request D 208 (e.g., value of 2), or the timestamp assigned to the request C 206 may be larger (e.g., value of 2) than the timestamp assigned to the request D 208 (e.g., value of 1).

The following example sequence of events for provision of timestamps may occur. Node A (leader) may receive a request for a timestamp from a client. Node A may be dysfunctional (e.g., Node A erroneously entered a garbage collection cycle/a Java Virtual Machine goes to sleep). Node B may become the leader and receive a request for a timestamp from a client. Node B may issue a timestamp with value X+1 to its client. Node A may become functional and issue a timestamp with value X to its client.

The following sequence of events for provision of timestamps may not occur. Node A (leader) may receive a request for a timestamp from a client. Node A may issue a timestamp with value X+1 to its client. Node B may become the leader may receive a request for a timestamp from a client. Node B may issue a timestamp with value X to its client.

Figure 3:
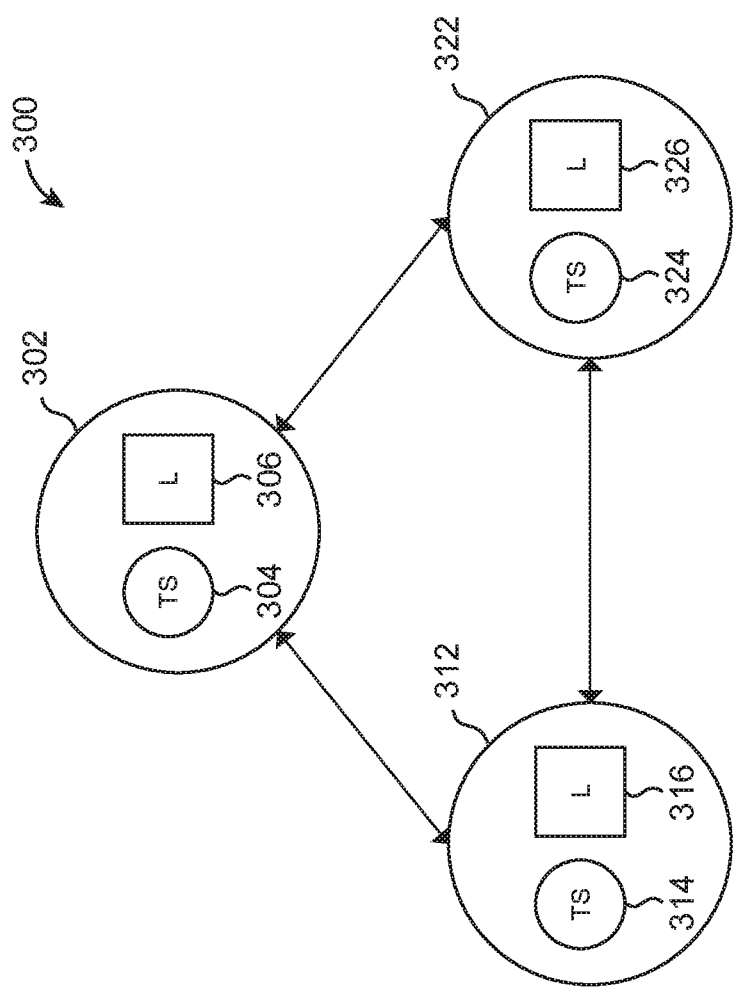
FIG. 3 illustrates an example environment for providing a redundancy tool for performing transactions, in accordance with various embodiments.

FIG. 3 illustrates an example environment 300 for providing a redundancy tool for performing transactions. The example environment 300 may be implemented within a processor (e.g., a timelock processor). The example environment 300 may include three dedicated timelock nodes 302, 312, 322. Individual timelock nodes 302, 312, 322 may contain implementations of timestamp services 304, 314, 324 and timelock services 306, 316, 326. Individual timelock nodes 302, 312, 322 (timestamp services 304, 314, 324 and timelock services 306, 316, 326) may communicate with one another to come to a consensus on values of timestamps (a single value or a range of values) to be issued and/or to come to a consensus on whether a lock operation is to be perform (e.g., assigning, refreshing, removing a lock on a timestamp).

In some embodiments, one of the timelock nodes 302, 312, 322 (timestamp services 304, 314, 324) may be selected to be a leader for provision of timestamps. In some embodiments, one of the timelock nodes 302, 312, 322 (timelock services 306, 316, 326) may be selected to be a leader for provision of timelocks. In some embodiments, the same node may be selected to be a leader for provision of timestamp and timelocks.

Use of a separate processor including the timelock nodes 302, 312, 322 may enable a user/client to obtain timestamp/lock via communication with a single entity rather than with multiple entities. Use of dedicated timelock nodes 302, 312, 322 provides segregation of codes for timestamp/timelock from other codes, and enables changes to the timelock codes (e.g., updates, optimization) without requiring rebuild of other codes.

Figure 4:
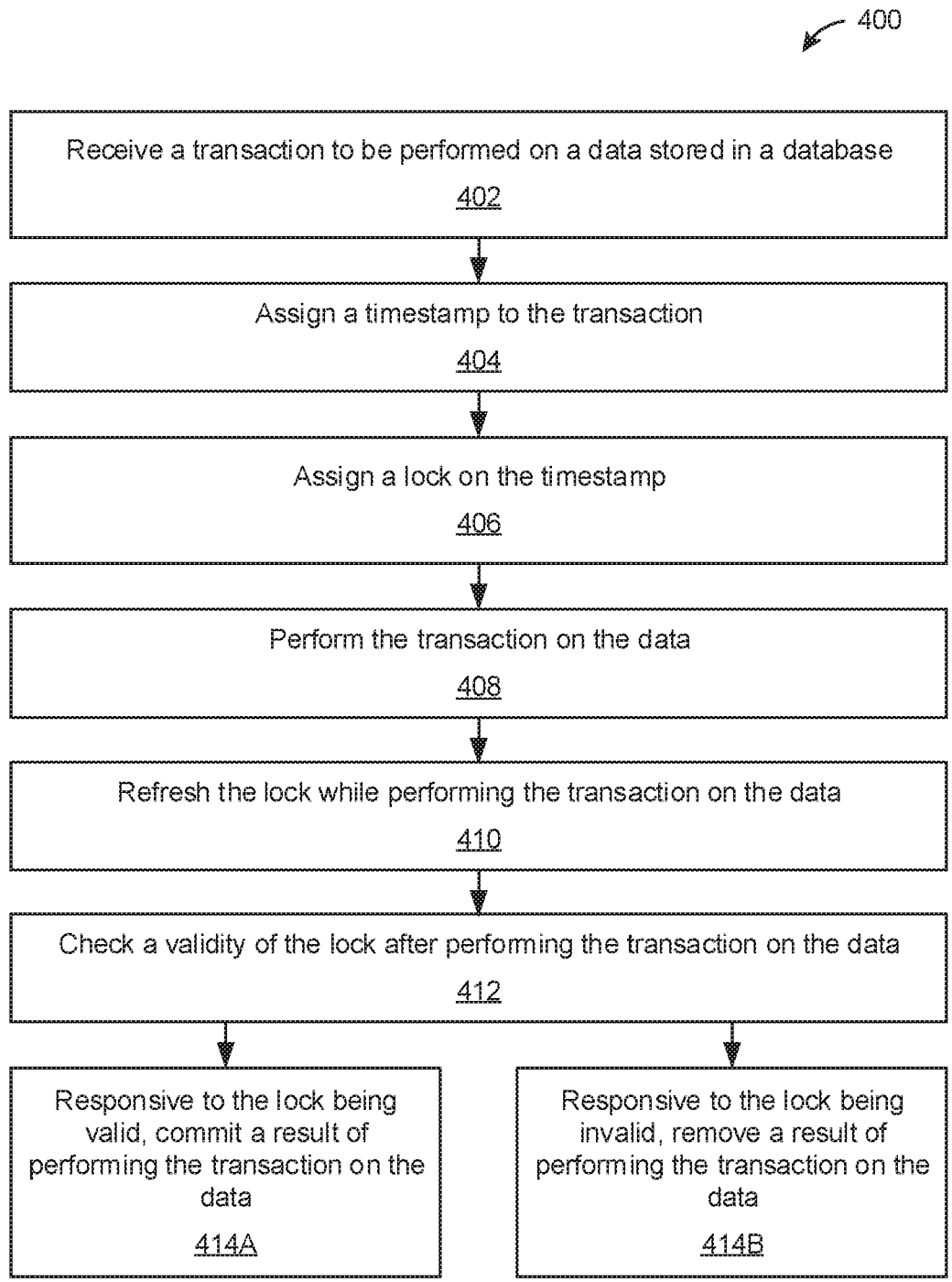
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a transaction to be performed on a data stored in a database may be received. At block 404, a timestamp may be assigned to the transaction. At block 406, a lock may be assigned on the timestamp. At block 408, the transaction may be performed on the data. At block 410, the lock may be refreshed while performing the transaction on the data. At block 412, a validity of the lock may be checked after performing the transaction on the data. At block 414A, responsive to the lock being valid, a result of performing the transaction on the data may be committed. At block 414B, responsive to the lock being invalid, a result of performing the transaction on the data may be removed.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
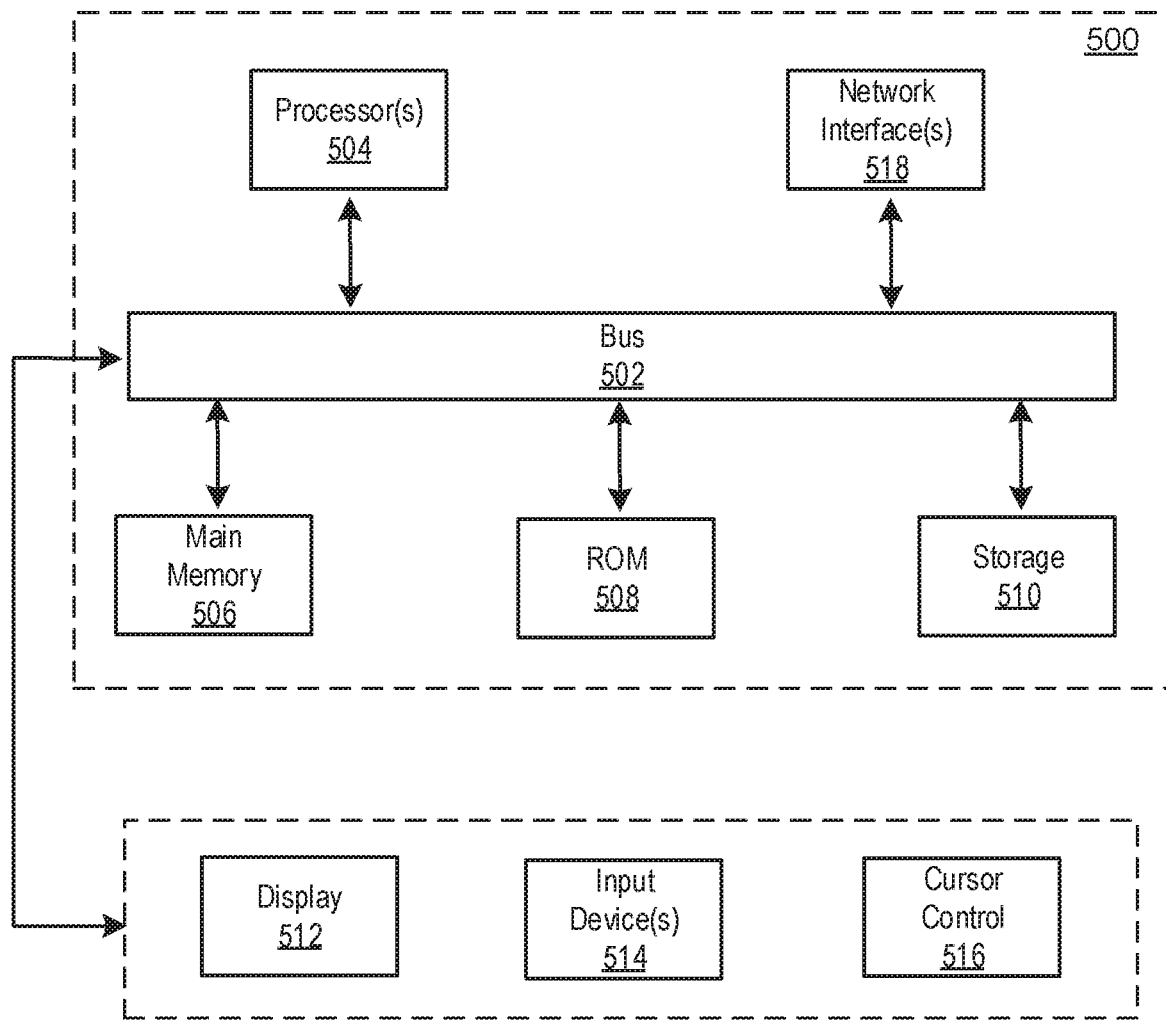
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors;
memory storing instructions that, when executed by the one or more processors, cause the system to perform:
receiving, by a first dedicated timelock node of dedicated timelock nodes, a request for one or more first timestamps, wherein the dedicated timelock nodes comprise a leader node and a non-leader node;
if the first dedicated timelock node is the non-leader node, assigning the request to the leader node;
writing, by the leader node to a datastore, an upper bound for the request;
determining that the leader node has failed during issuing of the one or more first timestamps;
in response to determining that the leader node has failed, reassigning the non-leader node as a new leader node; and
completing, by the new leader node, issuing of one or more first second timestamps, based on the upper bound;
receiving an indication that the leader node has returned to an operational status;
in response to receiving the indication, reassigning the new-leader node back to a non-leader node; and
completing, by the leader node, issuing of the one or more first timestamps and one or more third timestamps.

2. The system of claim 1, wherein the instructions further cause the system to perform:
reserving, by the non-leader node, a range of timestamps defined by the upper bound; and
issuing, by the non-leader node, a first timestamp from the reserved range of timestamps.

3. The system of claim 1, wherein the determining that the leader node has failed comprises determining that the leader node has entered a garbage collection cycle.

4. The system of claim 1, wherein the determining that the leader node has failed comprises determining that the leader node has entered a sleep cycle.

5. The system of claim 1, wherein the instructions further cause the system to perform:
assigning, based on a first consensus among the dedicated timelock nodes, a lock on the first timestamp; and
removing, based on a second consensus among the dedicated timelock nodes, the lock on the first timestamp.

6. The system of claim 1, wherein the one or more first timestamps correspond to an operation comprising a data import, export, or modification, and the one or more third timestamps correspond to a result of the operation.

7. A method implemented by a computing system including one or more processors and storage media storing machine-readable instructions, wherein the method is performed using the one or more processors, the method comprising:
receiving, by a first dedicated timelock node of dedicated timelock nodes, a request for one or more first timestamps, wherein the dedicated timelock nodes comprise a leader node and a non-leader node;
if the first dedicated timelock node is the non-leader node, assigning the request to the leader node;
writing, by the leader node to a datastore, an upper bound for the request;
determining that the leader node has failed during issuing of the one or more first timestamps;
in response to determining that the leader node has failed, reassigning the non-leader node as a new leader node; and
completing, by the new leader non leader node, the issuing of one or more second timestamps, based on the upper bound;
receiving an indication that the leader node has returned to an operational status;
in response to receiving the indication, reassigning the new-leader node back to a non-leader node; and
completing, by the leader node, issuing of the one or more first timestamps and one or more third timestamps.

8. The method of claim 7, further comprising:
reserving, by the non-leader node, a range of timestamps defined by the upper bound; and
issuing, by the non-leader node, a first timestamp from the reserved range of timestamps.

9. The method of claim 7, wherein the determining that the leader node has failed comprises determining that the leader node has entered a garbage collection cycle.

10. The method of claim 7, wherein the determining that the leader node has failed comprises determining that the leader node has entered a sleep cycle.

11. The method of claim 7, further comprising:
assigning, based on a first consensus among the dedicated timelock nodes, a lock on the first timestamp; and removing, based on a second consensus among the dedicated timelock nodes, the lock on the first timestamp.

12. The method of claim 7, wherein the one or more first timestamps correspond to an operation comprising a data import, export, or modification, and the one or more third timestamps correspond to a result of the operation.

13. A non-transitory computer readable medium comprising instructions that, when executed, cause one or more processors to perform:
- receiving, by a first dedicated timelock node of dedicated timelock nodes, a request for one or more first timestamps, wherein the dedicated timelock nodes comprise a leader node and a non-leader node;
- if the first dedicated timelock node is the non-leader node, assigning the request to the leader node;
- writing, by the leader node to a datastore, an upper bound for the request;
- determining that the leader node has failed during issuing of the one or more first timestamps;
- in response to determining that the leader node has failed, reassigning the non-leader node as a new leader node; and
- completing, by the new leader non leader node, the issuing of one or more second timestamps, based on the upper bound;
- receiving an indication that the leader node has returned to an operational status;
- in response to receiving the indication, reassigning the new-leader node back to a non-leader node; and
- completing, by the leader node, issuing of the one or more first timestamps and one or more third timestamps.

14. The non-transitory computer readable medium of claim 13, wherein the instructions further cause the one or more processors to perform:
- reserving, by the non-leader node, a range of timestamps defined by the upper bound; and
- issuing, by the non-leader node, a first timestamp from the reserved range of timestamps.

15. The non-transitory computer readable medium of claim 13, wherein the determining that the leader node has failed comprises determining that the leader node has entered a garbage collection cycle.

16. The system of claim 1, wherein the leader node is a leader for provision of timestamps, and the non-leader node is selected as a leader for provision of timelocks.

17. The system of claim 16, wherein when the non-leader node becomes the new leader node, a different node besides the new leader node and the leader node is selected as a leader for provision of timestamps.

18. The system of claim 1, wherein the first timestamps have a lower value than the second timestamps even though the first timestamps were issued at a later time compared to the second timestamps.

\* \* \* \* \*